(12) United States Patent
Kashiwai et al.

(10) Patent No.: US 11,518,188 B2
(45) Date of Patent: Dec. 6, 2022

(54) NON-PNEUMATIC TIRE

(71) Applicant: HONDA MOTOR CO., LTD., Tokyo (JP)

(72) Inventors: Mikio Kashiwai, Wako (JP); Nobuo Kambara, Wako (JP); Atsushi Hirano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 16/637,289

(22) PCT Filed: Jul. 2, 2018

(86) PCT No.: PCT/JP2018/025021
§ 371 (c)(1),
(2) Date: Feb. 7, 2020

(87) PCT Pub. No.: WO2019/031103
PCT Pub. Date: Feb. 14, 2019

(65) Prior Publication Data
US 2020/0247180 A1    Aug. 6, 2020

(30) Foreign Application Priority Data
Aug. 9, 2017   (JP) .............................. JP2017-154592

(51) Int. Cl.
*B60B 3/02*     (2006.01)
*B60C 7/14*     (2006.01)
(Continued)

(52) U.S. Cl.
CPC .................. *B60B 3/02* (2013.01); *B60B 3/04* (2013.01); *B60B 21/02* (2013.01); *B60C 7/146* (2021.08);
(Continued)

(58) Field of Classification Search
CPC ..... B60C 7/14; B60C 7/146; B60C 2007/146; B60B 9/02; B60B 9/04; B60B 9/26;
(Continued)

(56) References Cited

U.S. PATENT DOCUMENTS 807,748 A * 12/1905 Knadler .................... B60C 7/12
152/382
1,428,741 A *  9/1922 Allison ..................... B60B 3/04
152/DIG. 13
(Continued)

FOREIGN PATENT DOCUMENTS

CA    2201523 A1 * 10/1997    ............. B60B 21/02
CA    2201524 A1 * 10/1997    ............... B60B 5/02
(Continued)

OTHER PUBLICATIONS

Extended European Search Report for European Patent Application No. 18843124.1 dated Oct. 27, 2020.
(Continued)

*Primary Examiner* — Kip T Kotter
(74) *Attorney, Agent, or Firm* — Amin, Turocy & Watson, LLP

(57) ABSTRACT

This non-pneumatic tire is provided with a tread ring, a wheel which is arranged radially inside of the tread ring, and spokes which are interposed between the tread ring and the wheel. Further, the wheel has a disc part to which the vehicle shaft is linked, and a rim part which is connected on the inner peripheral side to the disc part and is joined on the outer peripheral side to the spokes. In this configuration, the average thickness (T1) of the disc part is set to be less than the average thickness (T2) of the rim part. In other words, the relation T1<T2 holds.

5 Claims, 7 Drawing Sheets

(51) Int. Cl.
  B60B 21/02 (2006.01)
  B60B 3/04 (2006.01)
  B60B 9/04 (2006.01)
  B60B 9/26 (2006.01)
  B60C 7/00 (2006.01)

(52) U.S. Cl.
  CPC . *B60B 9/04* (2013.01); *B60B 9/26* (2013.01); *B60C 7/00* (2013.01)

(58) Field of Classification Search
  CPC .......... B60B 21/02; B60B 21/10; B60B 3/02; B60B 3/04
  See application file for complete search history.

(56) References Cited

U.S. PATENT DOCUMENTS

| | | | |
|---|---|---|---|
| 2002/0163245 A1* | 11/2002 | Watanabe | B60B 3/04 301/5.21 |
| 2016/0046154 A1 | 2/2016 | Kim | |
| 2016/0089935 A1 | 3/2016 | Iwamura et al. | |
| 2017/0113484 A1 | 4/2017 | Iwamura et al. | |

FOREIGN PATENT DOCUMENTS

| | | |
|---|---|---|
| CN | 86106585 | 7/1987 |
| CN | 2384794 | 6/2000 |
| EP | 3045322 | 7/2016 |
| JP | 3497792 B2 * | 2/2004 |
| JP | 2008-049943 | 3/2008 |
| JP | 2008-162495 | 7/2008 |
| JP | 2008-302782 | 12/2008 |
| JP | 2014-118128 | 6/2014 |
| JP | 2016-041573 | 3/2016 |
| WO | 2014/188912 | 11/2014 |

OTHER PUBLICATIONS

International Search Report and Written Opinion for International Application No. PCT/JP2018/025021 dated Sep. 18, 2018, 7 pages.
Chinese Office Action for Chinese Patent Application No. 201880051695.2 dated May 25, 2021.
European Office Action for European Patent Application No. 18843124.1 dated Oct. 27, 2021.

* cited by examiner

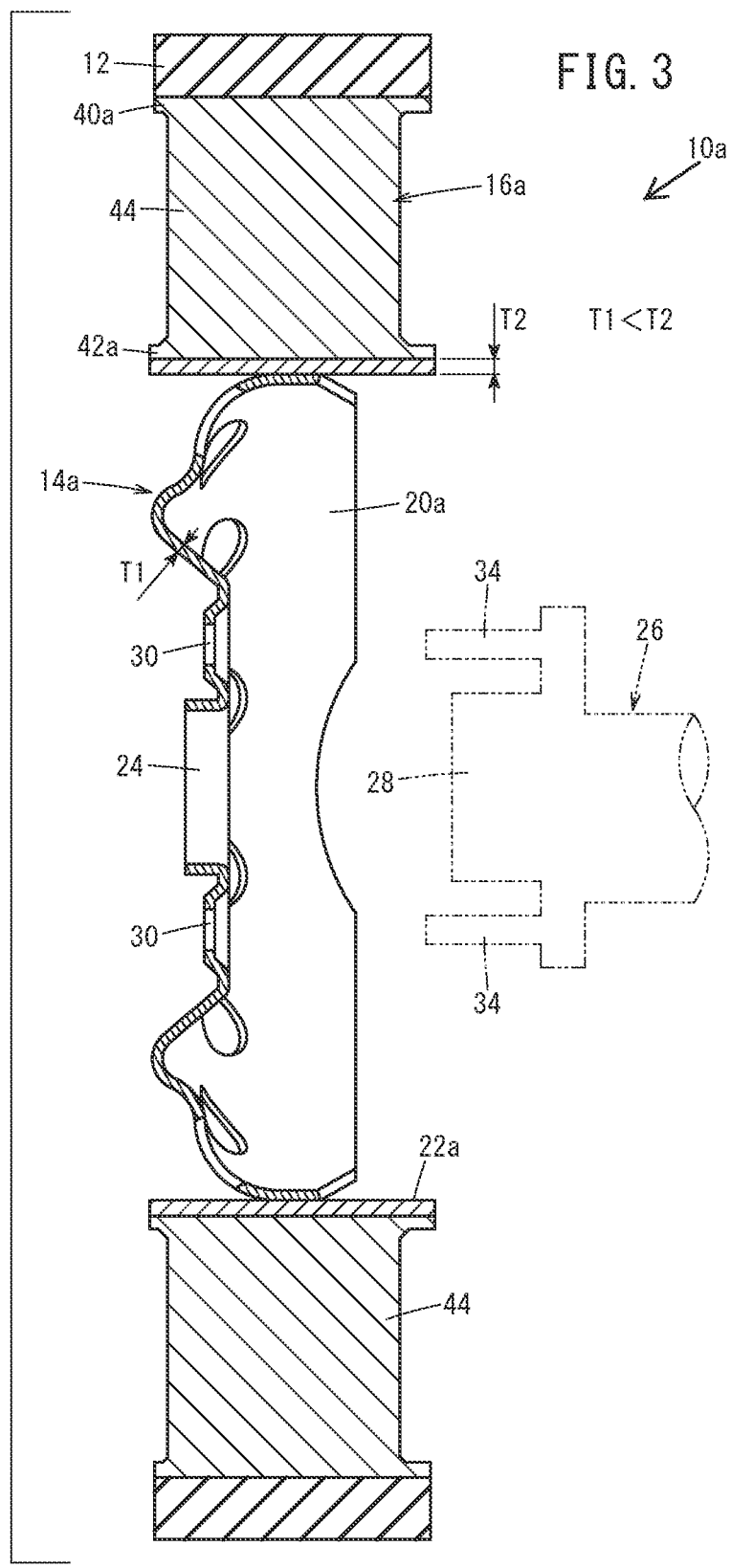

(20km/h)
LATERAL FORCE [N]
TIME [SECONDS]

(40km/h)
LATERAL FORCE [N]
TIME [SECONDS]

(80km/h)
LATERAL FORCE [N]
TIME [SECONDS]

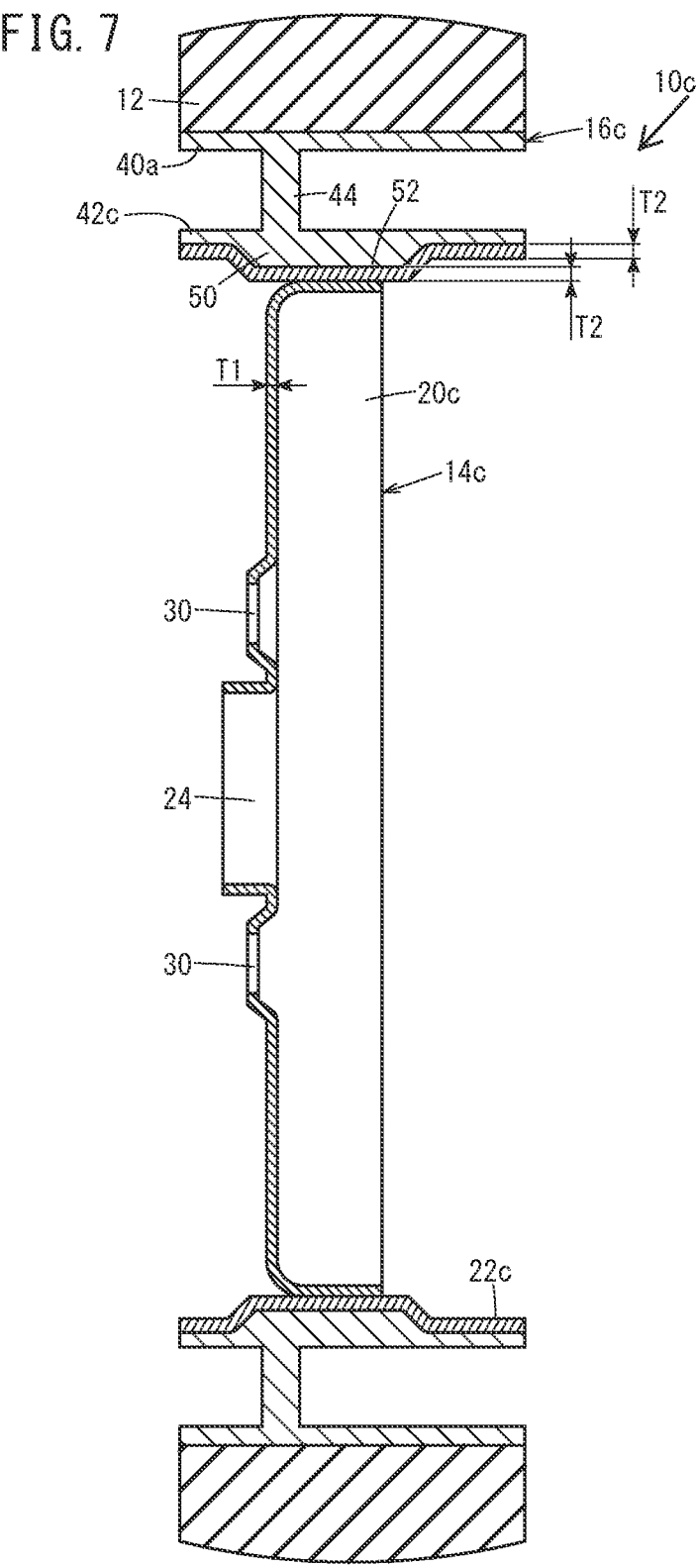

NON-PNEUMATIC TIRE

TECHNICAL FIELD

The present invention relates to a non-pneumatic tire including a tread part, a wheel part, and a spoke part.

BACKGROUND ART

A general tire is attached to a wheel and filled with air (hereinafter this tire is referred to as a "pneumatic tire (air tire)"). On the other hand, particularly a micro electric vehicle (MEV) has come to employ a non-pneumatic tire (airless tire) that can be used without being filled with air. In this case, the non-pneumatic tire is advantageous because daily check of the tire pressure is unnecessary and the non-pneumatic tire is free of risk of a tire puncture.

In a vehicle including non-pneumatic tires, in order to mitigate the sense of discomfort experienced by a user (driver or passenger), it is desirable that the user can feel comfortable and steer stably in a manner similar to a vehicle including the pneumatic tires. Therefore, the non-pneumatic tire is required to exhibit the characteristics equivalent to those of the pneumatic tire. From such a perspective, Japanese Laid-Open Patent Publication No. 2016-041573, Japanese Laid-Open Patent Publication No. 2014-118128, and International Publication No. WO 2014/188912 have made various suggestions.

SUMMARY OF INVENTION

As described in Japanese Laid-Open Patent Publication No. 2016-041573, Japanese Laid-Open Patent Publication No. 2014-118128, and International Publication No. WO 2014/188912, it has conventionally been attempted to improve the characteristics of the non-pneumatic tire by setting the structure, the shape, and the material of a tread part or a spoke part; however, further improvement of the characteristics of the non-pneumatic tire has been required.

It is a main object of the present invention to provide a non-pneumatic tire exhibiting a transient characteristic similar to that of a pneumatic tire at the time a vehicle makes a turn while traveling at high speed.

A non-pneumatic tire according to one embodiment of the present invention includes a tread part with a cylindrical shape that is in contact with a ground surface, a wheel part disposed inside the tread part in a radial direction, and a spoke part interposed between the tread part and the wheel part, wherein: the wheel part includes a disk part to which an axle is connected, and a rim part whose inner circumferential side is continuously connected to the disk part and outer circumferential side is joined to the spoke part; and an average thickness of the disk part is smaller than an average thickness of the rim part.

In this case, the disk part is easily bent. Therefore, when the vehicle makes a turn (corners), the change in responsiveness due to the speed increase is reduced. In addition, in a high-speed range, the transient characteristic similar to that of a pneumatic tire can be obtained. Therefore, a sense of discomfort experienced by a user is mitigated and accordingly, the user feels as comfortable as he feels in the vehicle having the pneumatic tires.

Note that it is preferable that the spoke part includes an internal ring part to which the rim part is joined, an external ring part for which the tread part is provided, and a plurality of spokes that integrally connect the internal ring part and the external ring part. Since the spokes provide the elastic operation, external force in the travel is relieved. In addition, it becomes easier to join the wheel part or provide the tread part.

In the wheel part, the disk part and the rim part may be provided as separate members and joined to each other. In this case, the shape of the disk part can be changed variously and the thickness and the height of the rim part can be individually changed variously. Thus, the collapse (or tilting) rigidity of the disk part and/or the flexural rigidity of the rim part in the radial direction thereof can be set easily.

The wheel part may be formed by a single member that integrally includes the disk part and the rim part. In this case, the joining work is unnecessary. Moreover, for example, in a case of manufacturing the wheel part from an aluminum alloy expanded material, the weight can be reduced.

According to the present invention, the average thickness of the disk part included in the wheel part is set to be smaller than the average thickness of the rim part that is similarly included in the wheel part. Therefore, the disk part is easily bent and the members of the wheel part are mainly made of metal; thus, the change in spring constant due to the increase in rotation speed hardly occurs. Accordingly, at the turning (cornering), the change in responsiveness due to the speed increase is reduced and the transient characteristic similar to that of the pneumatic tire can be obtained in the high-speed range.

As a result, the sense of discomfort experienced by a user is mitigated and accordingly, the user feels as comfortable as he feels in the vehicle having the pneumatic tires.

BRIEF DESCRIPTION OF DRAWINGS

FIG. 3 is a side cross-sectional view of the non-pneumatic tire in FIG. 1;

FIG. 7 is a side cross-sectional view of a non-pneumatic tire according to still another embodiment.

DESCRIPTION OF EMBODIMENTS

Preferred embodiments of a non-pneumatic tire according to the present invention are hereinafter described in detail with reference to the attached drawings.

Figure 1:
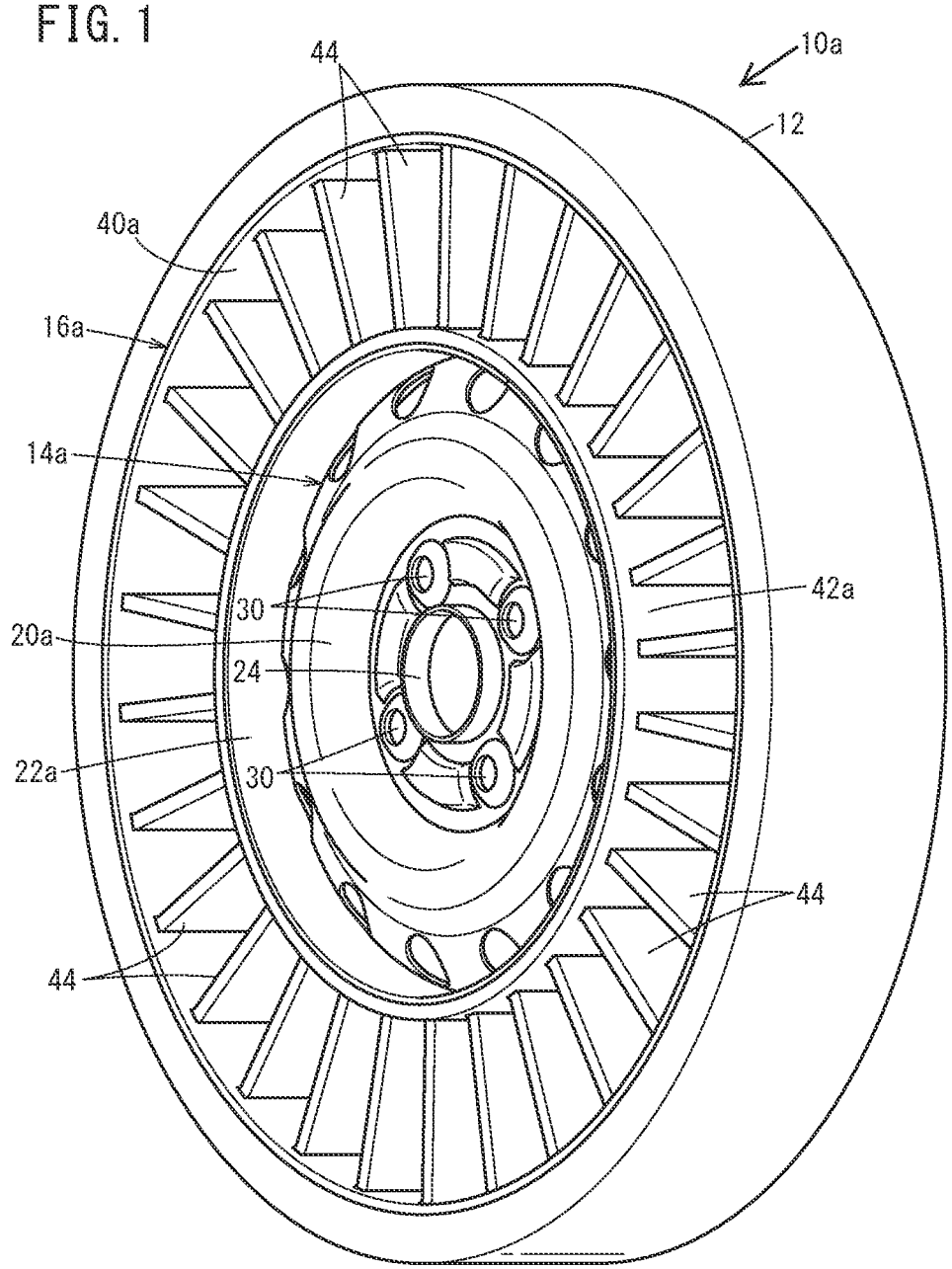
FIG. 1 is an overall schematic perspective view of a non-pneumatic tire according to one embodiment of the present invention.
Figure 2:
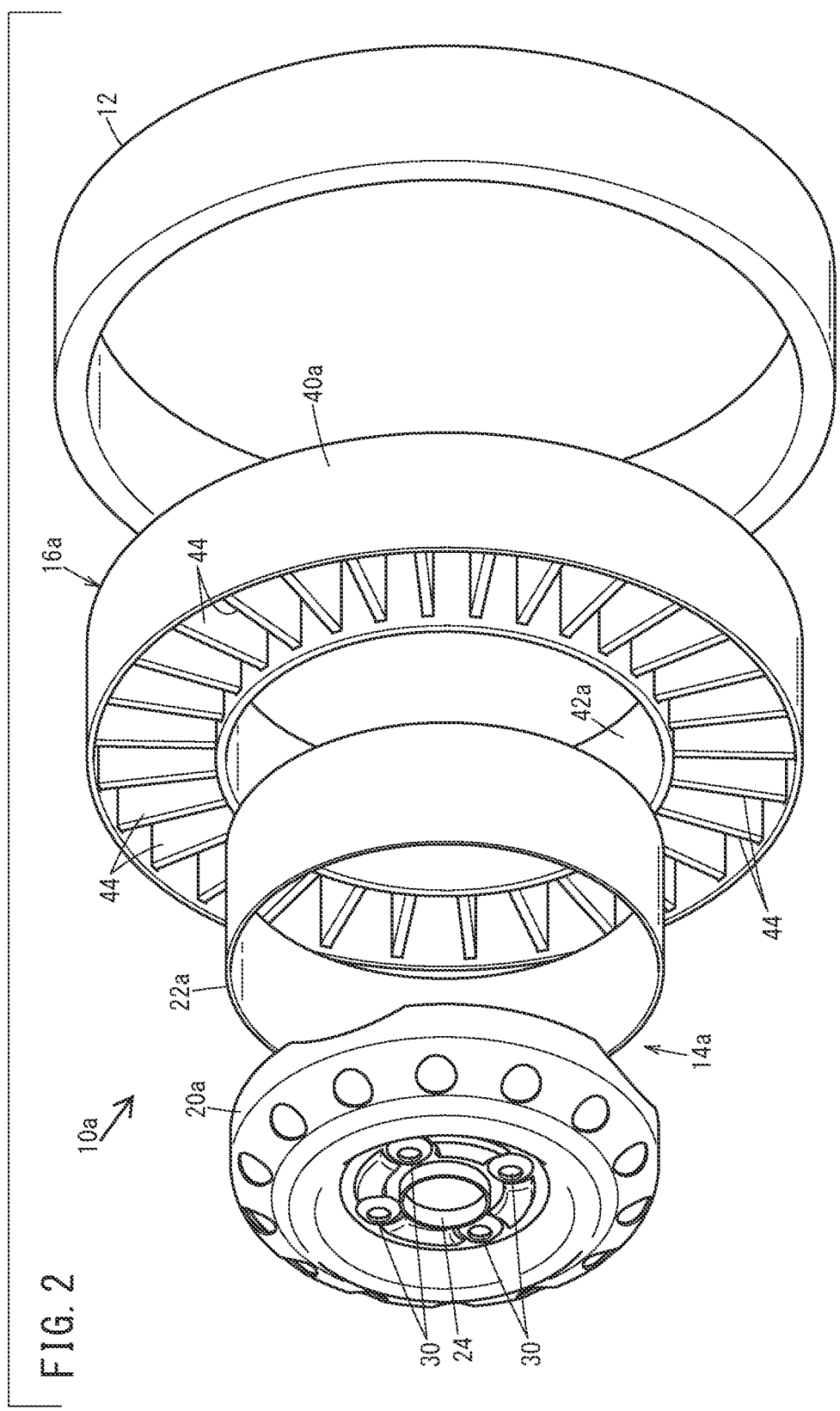
FIG. 2 is an exploded perspective view of the non-pneumatic tire in FIG. 1.

FIG. 1 to FIG. 3 are an overall schematic perspective view, an exploded perspective view, and a side cross-sectional view of a non-pneumatic tire 10a according to the present embodiment, respectively. This non-pneumatic tire 10a includes a cylindrical tread ring 12 (tread part), a wheel part 14a disposed inside the tread ring 12 in a radial direction thereof, and a spoke part 16a that connects the tread ring 12 and the wheel part 14a.

The tread ring 12 is formed by an annular body made of rubber with its outer circumferential wall serving as a ground contact surface. Note that the ground contact surface is provided with tread grooves that are not illustrated. By the tread grooves, sufficient grip force is obtained even on a wet road surface.

The wheel part 14a includes a disk part 20a with a disk shape, and a rim part 22a with a cylindrical shape that is continuously connected to the outside of the disk part 20a in a radial direction thereof. In this structure, a hub hole 24 is formed at a center of the disk part 20a. Through the hub hole 24, a front end part 28 of an axle 26 indicated by a virtual line in FIG. 3 is inserted. Around the hub hole 24, a plurality of bolt insertion holes 30 are formed. To each bolt insertion hole 30, a bolt part 34 provided on the axle 26 side is inserted, and the bolt part 34 is fixed by a nut that is not illustrated.

The disk part 20a is manufactured by, for example, press-forming a metal plate material similar to that of a conventional tire wheel, such as a steel material, aluminum alloy, or magnesium alloy.

On the other hand, the rim part 22a is formed by a cylindrical body, and in this case, the rim part 22a is a member manufactured separately from the disk part 20a. The rim part 22a is obtained by, for example, cutting the aforementioned metal plate member as a belt-shape body, thereafter bending the belt-shape body to bring end surfaces thereof into contact with each other, and joining the end surfaces in contact by a suitable method such as friction stir joining or welding. After the entire disk part 20a is housed inside the rim part 22a, an outer edge part of the disk part 20a and an inner circumferential wall of the rim part 22a are joined to each other by welding or the like, for example.

Here, when the average thickness of the disk part 20a is T1 and the average thickness of the rim part 22a is T2 (see FIG. 3), the relation of T1<T2 is satisfied. That is to say, the average thickness T1 of the disk part 20a is smaller than the average thickness T2 of the rim part 22a.

In this case, each of the disk part 20a and the rim part 22a is manufactured by a metal plate material with substantially the same thickness. Therefore, the thickness of each of the disk part 20a and the rim part 22a is substantially constant over the entire part. Thus, the relation of T1<T2 is satisfied entirely over the disk part 20a and the rim part 22a.

The spoke part 16a includes an external ring part 40a with an annular shape to which the tread ring 12 is fitted, an internal ring part 42a with an annular shape that is joined to the rim part 22a, and a plurality of spokes 44 that extend radially along the diameter of the non-pneumatic tire 10a. An inner circumferential side of each spoke 44 is integrally connected to the internal ring part 42a, and an outer circumferential side thereof is integrally connected to the external ring part 40a. The spoke part 16a as described above is formed of, for example, a polymer material such as thermoplastic resin or thermosetting resin. Preferred examples of the thermosetting resin include epoxy-based resin, phenol-based resin, urethane-based resin, silicone-based resin, polyimide-based resin, and melamine-based resin.

The non-pneumatic tire 10a according to the present embodiment is basically configured as described above, and next, the operation effect thereof is described.

As described above, the disk part 20a and the rim part 22a in the wheel part 14a of the non-pneumatic tire 10a are the separate members that are manufactured individually. Therefore, the shape of the disk part 20a can be changed variously and the thickness and the height of the rim part 22a can be changed variously. Thus, the collapse (or tilting) rigidity of the disk part 20a and/or the flexural rigidity of the rim part 22a in the radial direction thereof can be set particularly easily.

The non-pneumatic tire 10a with the above structure contributes to travelling when, for example, the non-pneumatic tire 10a is attached to the axle 26 of an MEV and rotated through the axle 26 by an action of a motor. In this case, the tread ring 12 is in contact with a ground surface (road surface). In addition, the spokes 44 of the spoke part 16a and the disk part 20a of the wheel part 14a receive the compressive bending force that acts in a circumferential direction of the non-pneumatic tire 10a so as to be bent in a rotating direction. That is to say, the spokes 44 and the disk part 20a function as an elastic body.

When the MEV or the like travels, the vehicle is turned at a curve or the like. In other words, cornering is performed. Here, a lateral force along a longitudinal direction of the axle 26 acts on the tread ring 12.

In a case where the slip angle of the tire has suddenly changed because of a sudden steering operation, a cornering force occurs with a time delay. This phenomenon is known as a transient characteristic of cornering, and occurs because of an influence from a change speed of the slip angle, a lateral rigidity of the tire, and a travel speed.

Figure 4A:
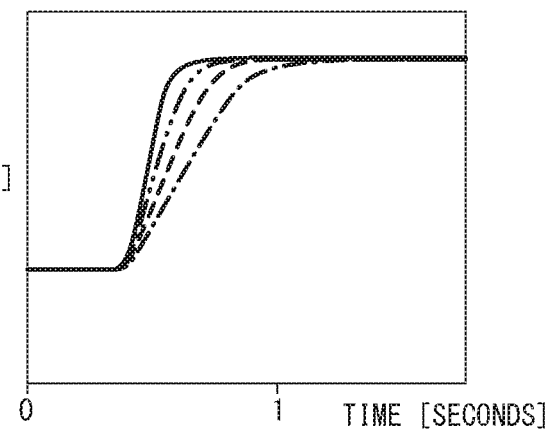
FIGS. 4A, 4B, and 4C are graphs each illustrating a transient characteristic of cornering force of various tires for each vehicle speed.
Figure 4B:
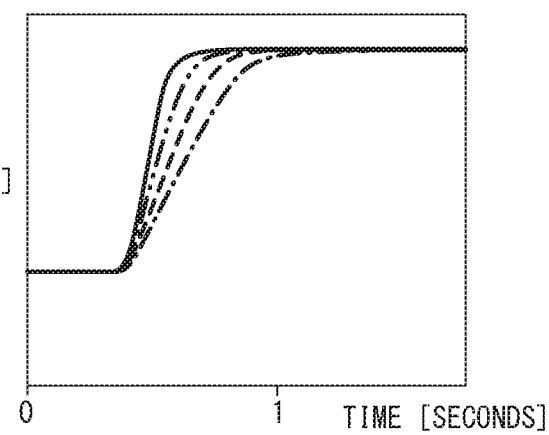
Figure 4C:
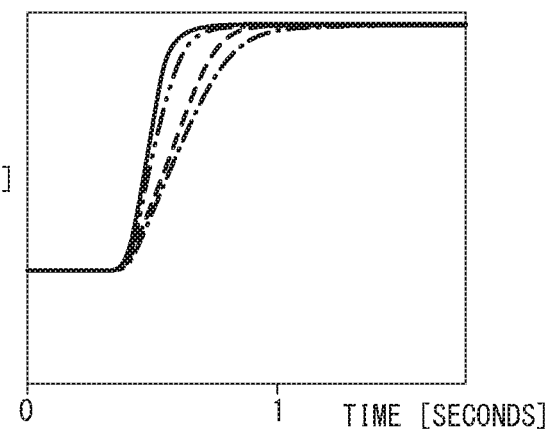

Each of FIG. 4A to FIG. 4C illustrates the transient characteristics of the cornering forces when the vehicle (MEV) including various tires travels at 20 km/h, 40 km/h, and 80 km/h, respectively. In the drawings, a solid line expresses a slip angle input and a dashed line expresses the transient characteristic obtained by the non-pneumatic tire 10a. In addition, a one-dot chain line and a two-dot chain line respectively express the transient characteristic of the pneumatic tire, and the transient characteristic of the non-pneumatic tire in which the average thickness T1 of the disk part 20a is larger than the average thickness T2 of the rim part 22a. FIG. 4A to FIG. 4C indicate that the non-pneumatic tire 10a can obtain the transient characteristic similar to that of the pneumatic tire.

Figure 5:
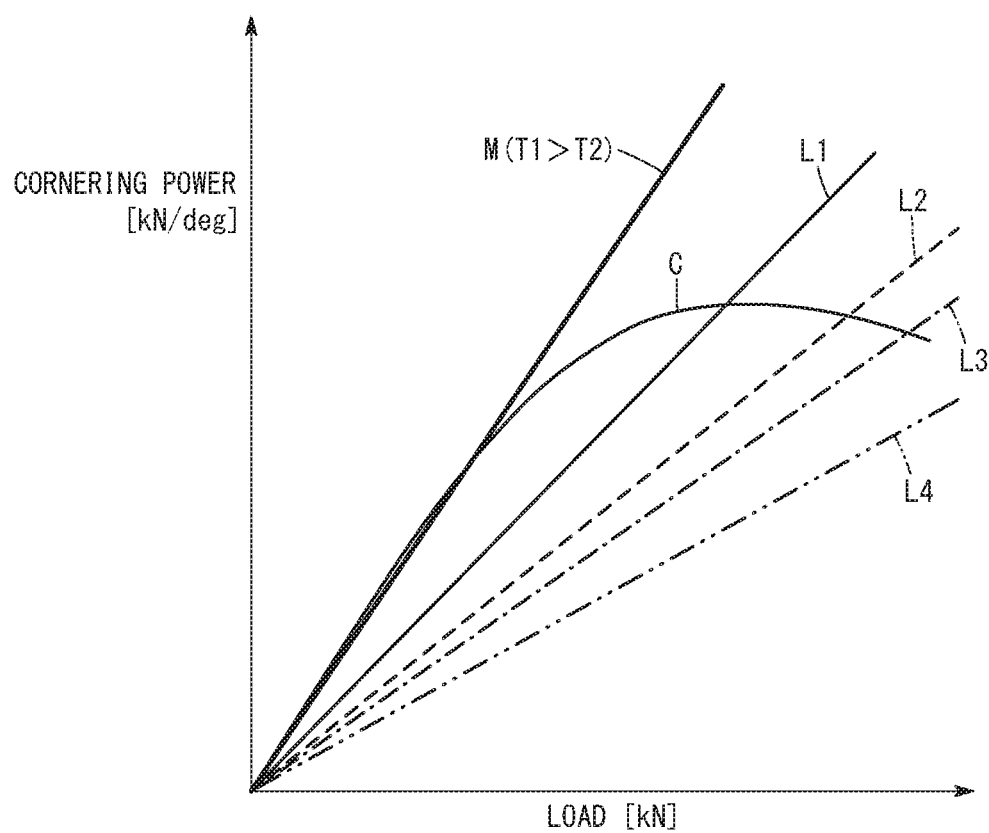
FIG. 5 is a graph expressing a relation between load and cornering power when a vehicle makes a turn while traveling.

Here, the average thickness T1 of the disk part 20a is smaller than the average thickness T2 of the rim part 22a. Therefore, the disk part 20a is easily bent. Thus, a linear relation as illustrated in FIG. 5 is obtained between the load at the turning and the cornering power corresponding to the increase rate of the cornering force. As the load is smaller, the speed is lower, and as the load is larger, the speed is higher.

In FIG. 5, a curved line C corresponds to the result obtained from the pneumatic tire, and a straight line M drawn with a thick solid line corresponds to the result obtained from the non-pneumatic tire satisfying T1>T2. Straight lines L1, L2, L3, and L4 drawn with a thin solid line, a dashed line, a one-dot chain line, and a two-dot chain line respectively are obtained from the non-pneumatic tire 10a and a non-pneumatic tire 10b according to the present embodiment satisfying T1<T2 (see FIG. 6). More specifically, the straight line L1 corresponds to a result obtained from the non-pneumatic tire 10b including a wheel part 14b formed by a single member that integrally includes a disk part 20b and a rim part 22b obtained from an aluminum alloy expanded material, and T1 is 4 mm and T2 is 7 mm. The straight lines L2 to L4 correspond to results obtained from the non-pneumatic tire 10a including the wheel part 14a in which the disk part 20a and the rim part 22a are manufactured individually as separate parts, having T1 of 2 mm, 2 mm, and 2 mm, respectively, and T2 of 2.3 mm, 2.5 mm, and 2.8 mm, respectively.

In FIG. 5, it can be realized that by setting T1<T2, the change of the responsiveness by the speed increase can be reduced although the responsiveness is low in the low-speed range, and in the high-speed range, the transient characteristic similar to that of the pneumatic tire can be obtained. Therefore, it is possible to dispel concerns that the user feels a sense of discomfort. That is to say, according to the present embodiment, the user feels as comfortable as he feels in the vehicle having pneumatic tires.

The present invention is not limited particularly to the aforementioned embodiment and various changes can be made within the range not departing from the gist of the present invention.

Figure 6:
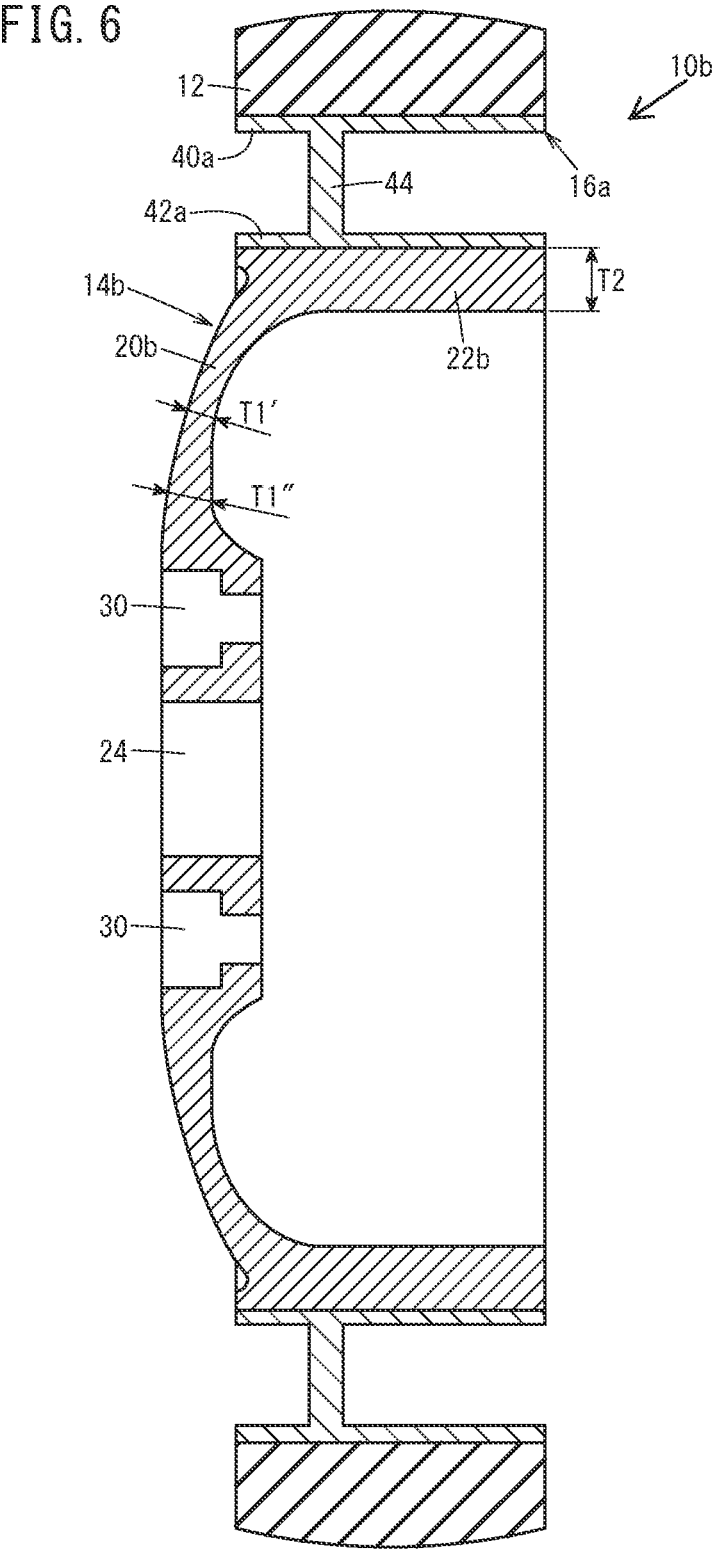
FIG. 6 is a side cross-sectional view of a non-pneumatic tire according to another embodiment.

For example, as is understood from the above description, the wheel part may be formed by a single member that integrally includes the disk part and the rim part. The non-pneumatic tire 10b with such a structure is illustrated in FIG. 6. Note that the same components as those in FIG. 1 to FIG. 3 are denoted with the same reference signs. In addition, the reference signs 14b, 20b, and 22b respectively denote the wheel part, the disk part, and the rim part.

In addition, as illustrated in FIG. 6, the thickness of the disk part 20b may be changed. In this case, the average thickness T1 may be calculated from the thicknesses of the respective portions of the disk part 20b (for example, T1', T1", and the like) and this calculated value may be made smaller than the average thickness T2 of the rim part 22b.

In addition, a non-pneumatic tire 10c illustrated in FIG. 7 may be provided. In this case, a wheel part 14c includes a disk part 20c that is flat, and a spoke part 16c includes an internal ring part 42c provided with a thick part 50. Corresponding to the thick part 50, a rim part 22c includes an annular concave part 52.

REFERENCE SIGNS LIST 10a to 10c: non-pneumatic tire
12: tread ring
14a to 14c: wheel part
16a, 16c: spoke part
20a to 20c: disk part
22a to 22c: rim part
26: axle
30: bolt insertion hole
40a: external ring part
42a, 42c: internal ring part
44: spoke
50: thick part

The invention claimed is:

1. A non-pneumatic tire and wheel assembly comprising a tread part with a cylindrical shape that is in contact with a ground surface, a wheel part disposed inside the tread part in a radial direction, and a spoke part interposed between the tread part and the wheel part, wherein:

the wheel part includes a disk part to which an axle is connected, and a rim part whose inner circumferential side is continuously connected to the disk part and outer circumferential side is joined to the spoke part;

the thickness of the rim part is substantially constant;

an average thickness of the disk part is smaller than an average thickness of the rim part;

the thickness of the disk part decreases by tapering radially outwards from a center portion of the disk part; and the disk part is continuously convex from the center portion to the rim part.

2. The non-pneumatic tire and wheel assembly according to claim 1, wherein the spoke part includes an internal ring part to which the rim part is joined, an external ring part for which the tread part is provided, and a plurality of spokes that integrally connect the internal ring part and the external ring part.

3. The non-pneumatic tire and wheel assembly according to claim 1, wherein in the wheel part, the disk part and the rim part are provided as separate members and are joined to each other.

4. The non-pneumatic tire and wheel assembly according to claim 1, wherein the wheel part is formed by a single member that integrally includes the disk part and the rim part.

5. A non-pneumatic tire and wheel assembly comprising a tread part with a cylindrical shape that is in contact with a ground surface, a wheel part disposed inside the tread part in a radial direction, and a spoke part interposed between the tread part and the wheel part, wherein:

the wheel part includes a disk part to which an axle is connected, and a rim part whose inner circumferential side is continuously connected to the disk part and outer circumferential side is joined to the spoke part;

the thickness of the rim part is substantially constant;

an average thickness of the disk part is smaller than an average thickness of the rim part;

the disk part comprises a bend in a rotating direction that receives a compressive bending force in a circumferential direction;

the thickness of the disk part decreases by tapering radially outwards from a center portion of the disk part; and the disk part is continuously convex from the center portion to the rim part.

* * * * *